United States Patent
Gamaley et al.

(10) Patent No.: US 9,037,602 B2
(45) Date of Patent: May 19, 2015

(54) AUTOMATIC CORRECTION OF CONTACT LIST ERRORS IN A COLLABORATION SYSTEM

(75) Inventors: Vladimir Gamaley, Rehovot (IL); Gili Nachum, Bet-Shemesh (IL); Gil Perzy, Holon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 13/483,116

(22) Filed: May 30, 2012

(65) Prior Publication Data

US 2012/0246123 A1    Sep. 27, 2012

Related U.S. Application Data

(63) Continuation of application No. 13/053,738, filed on Mar. 22, 2011.

(51) Int. Cl.
    *G06F 7/00*      (2006.01)
    *G06F 17/30*     (2006.01)
    *G06Q 10/10*     (2012.01)

(52) U.S. Cl.
    CPC ...................... *G06Q 10/10* (2013.01)

(58) Field of Classification Search
    CPC ....... H04L 67/04; H04L 51/04; H04L 12/581; H04L 67/306; H04L 12/5895; H04L 51/38; G06F 17/30864; G06F 3/1204; G06F 3/122; G06F 3/1236; G06F 3/1238
    See application file for complete search history.

(56) References Cited

U.S. PATENT DOCUMENTS

| | | | |
|---|---|---|---|
| 6,973,299 B2 | 12/2005 | Apfel | |
| 7,360,164 B2 | 4/2008 | Bjoernsen et al. | |
| 7,487,214 B2 | 2/2009 | Qureshi et al. | |
| 7,620,387 B2 | 11/2009 | Rybak | |
| 7,624,421 B2 | 11/2009 | Ozzie et al. | |
| 7,631,266 B2 | 12/2009 | Werndorfer et al. | |
| 7,797,293 B2 | 9/2010 | Pabla et al. | |
| 2004/0003046 A1 | 1/2004 | Grabelsky et al. | |
| 2004/0133561 A1* | 7/2004 | Burke | 707/3 |
| 2005/0141687 A1 | 6/2005 | Ozugur et al. | |
| 2006/0168060 A1* | 7/2006 | Briand et al. | 709/206 |

(Continued)

FOREIGN PATENT DOCUMENTS

| | | |
|---|---|---|
| WO | 200193515 | 12/2001 |
| WO | 03054717 A1 | 7/2003 |

*Primary Examiner* — Tony Mahmoudi
*Assistant Examiner* — Tuan A Pham
(74) *Attorney, Agent, or Firm* — Patents on Demand P.A.; Brian K. Buchheit; Scott M. Garrett

(57) ABSTRACT

Managing a contact list in a collaboration system, by detecting if a contact has been offline for at least a predefined period of time and/or detecting if a target identifier is being entered into a contact list of a first user of a first collaboration system, where the contact is identified by a target identifier in a contact list of a first user of a first collaboration system, searching a collaboration system directory to find a replacement identifier associated with a second user of the first collaboration system, where the second user meets a predefined peer criterion with respect to the first user, and where the replacement identifier a) is different from a target identifier, and b) meets a predefined similarity criterion with respect to the target identifier, and replacing the target identifier with the replacement identifier in the contact list of the first user.

19 Claims, 6 Drawing Sheets

(56) References Cited

U.S. PATENT DOCUMENTS

| | | | |
|---|---|---|---|
| 2006/0271696 A1* | 11/2006 | Chen et al. | 709/229 |
| 2006/0288298 A1* | 12/2006 | Haitani et al. | 715/739 |
| 2007/0233785 A1 | 10/2007 | Abraham et al. | |
| 2007/0288575 A1 | 12/2007 | Gillum et al. | |
| 2008/0021970 A1 | 1/2008 | Werndorfer et al. | |
| 2008/0120387 A1 | 5/2008 | Werndorfer et al. | |
| 2008/0126482 A1 | 5/2008 | O'Sullivan et al. | |
| 2008/0311951 A1 | 12/2008 | Camp, Jr. et al. | |
| 2009/0150968 A1 | 6/2009 | Ozzie et al. | |
| 2009/0157705 A1 | 6/2009 | Nomiyama | |
| 2009/0172564 A1 | 7/2009 | Fish | |
| 2009/0307316 A1 | 12/2009 | Murphy et al. | |
| 2009/0319521 A1* | 12/2009 | Groeneveld et al. | 707/6 |
| 2010/0005398 A1* | 1/2010 | Pratley et al. | 715/751 |
| 2010/0017753 A1 | 1/2010 | Li et al. | |
| 2010/0067679 A1 | 3/2010 | Lei | |
| 2010/0175000 A1* | 7/2010 | Gupta et al. | 715/753 |
| 2010/0205546 A1* | 8/2010 | Appelman et al. | 715/758 |
| 2011/0055234 A1* | 3/2011 | Miettinen | 707/755 |

* cited by examiner

AUTOMATIC CORRECTION OF CONTACT LIST ERRORS IN A COLLABORATION SYSTEM

CROSS-REFERENCE TO RELATED APPLICATION

This application is a continuation of U.S. patent application Ser. No. 13/053,738, filed Mar. 22, 2011 (pending), which is incorporated herein in its entirety.

BACKGROUND

The disclosure relates to computer network-based communications in general, and in particular to real-time collaboration systems.

Real-time collaboration systems, such as instant messaging systems, are increasingly used within and between businesses and other organizations to enhance communications and cooperation between parties. Typically, before two parties can communicate with each other, each party must provide his or her collaboration system with an identifier that the collaboration system uses to identify the other party. Common examples of such identifiers include email addresses and collaboration system-specific user IDs, which are typically maintained in contact lists. Collaboration systems typically provide their users with "presence" notifications regarding the current status of the contacts in their contact lists, such as whether or not a contact is currently logged-in to his/her collaboration system and available to receive communications. Some collaboration systems provide gateways to allow their users to communicate with, and receive presence notifications regarding, contacts belonging to other collaboration systems.

BRIEF SUMMARY

In one aspect of the invention a method is provided for managing a contact list in a collaboration system, the method including detecting if a contact has been offline for at least a predefined period of time, where the contact is identified by a target identifier in a contact list of a first user of a first collaboration system, searching a collaboration system directory to find a replacement identifier associated with a second user, where the second user meets a predefined peer criterion with respect to the first user, and where the replacement identifier a) is different from the target identifier, and b) meets a predefined similarity criterion with respect to the target identifier, and adding the replacement identifier into the contact list of the first user.

In another aspect of the invention a method is provided for managing a contact list in a collaboration system, the method including detecting if a target identifier is being entered into a contact list of a first user of a first collaboration system, where the contact is identified by a target identifier in a contact list of a first user of a first collaboration system, searching a collaboration system directory to find a replacement identifier associated with a second user, where the second user meets a predefined peer criterion with respect to the first user, and where the replacement identifier a) is different from the target identifier, and b) meets a predefined similarity criterion with respect to the target identifier, and adding the replacement identifier into the contact list of the first user.

Systems and computer program products embodying embodiments of the invention are also provided.

DETAILED DESCRIPTION

Figure 1:
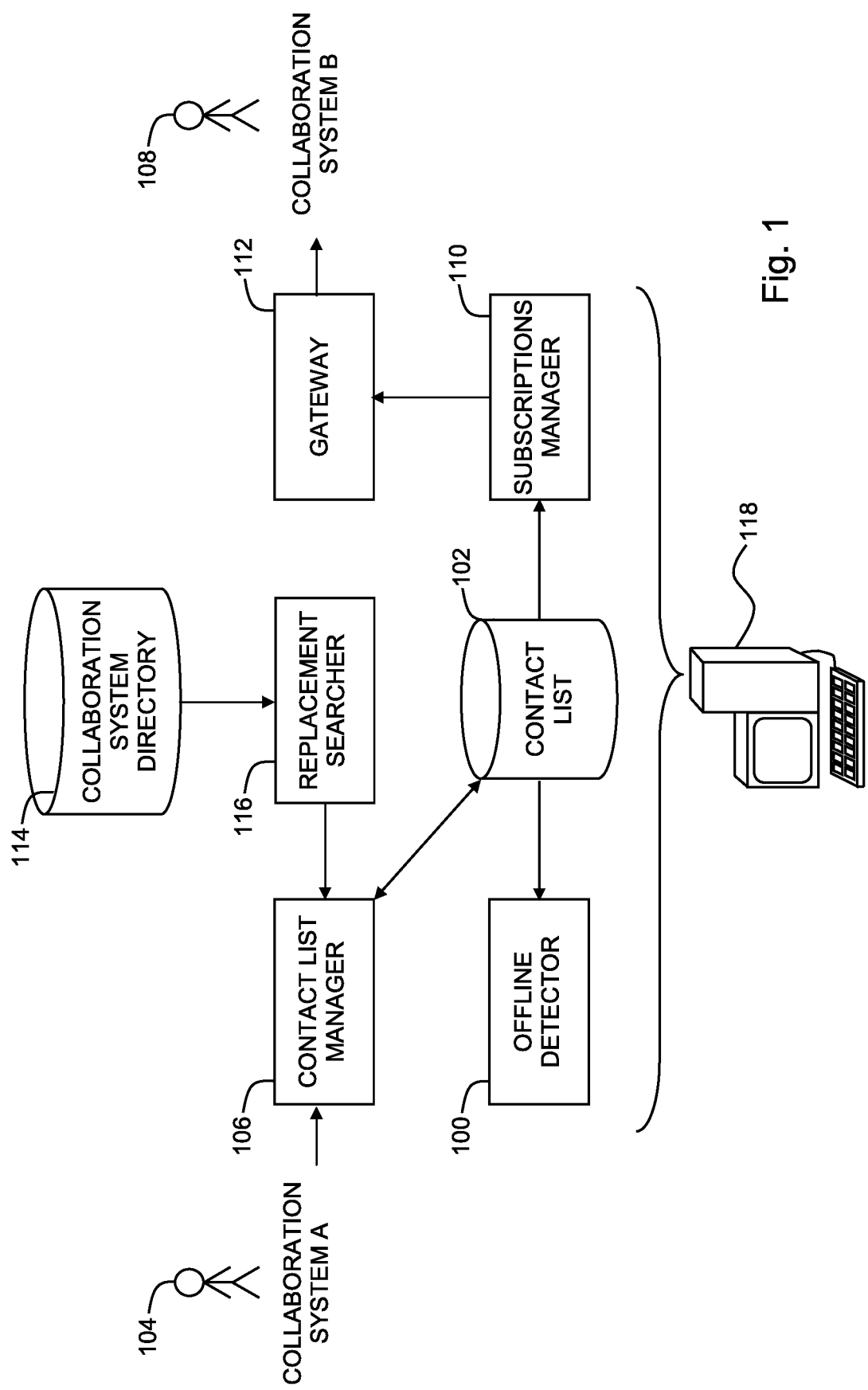
FIG. 1 is an illustration of a system for managing a contact list in a collaboration system, constructed and operative in accordance with an embodiment of the invention.

Some collaboration systems provide gateways to allow their users to communicate with and receive presence notifications regarding contacts belonging to other collaboration systems. Unfortunately, if a user of one collaboration system incorrectly enters into his/her contact list the identifier of a contact in another collaboration system, the user might not become aware of the error. This problem with conventional approaches was discovered by the inventors of the disclosure in the course of developing the invention.

One embodiment of the disclosure is for managing a contact list in a collaboration system, by detecting if a contact has been offline for at least a predefined period of time and/or detecting if a target identifier is being entered into a contact list of a first user of a first collaboration system. The contact can be identified by a target identifier in a contact list of a first user of a first collaboration system. A collaboration system directory can be searched to find a replacement identifier associated with a second user of the first collaboration system. The second user can satisfy predefined peer criteria with respect to the first user. For example, the criteria can ensure that the replacement identifier is different from a target identifier, and meets a predefined similarity criterion with respect to the target identifier. Responsive to the predefined peer criteria being satisfied, the target identifier can be replaced with the replacement identifier in the contact list of the first user.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is an illustration of a system for managing a contact list in a collaboration system, constructed and operative in accordance with an embodiment of the invention. In the system of FIG. 1, an offline detector 100 is configured to detect if a contact associated with an identifier (hereinafter "the target identifier") in a contact list 102 has been offline for at least a predefined period of time. Contact list 102 may, for example, be a contact list belonging to a user 104 of a collaboration system (hereinafter "collaboration system A") such as IBM Lotus Sametime™, commercially-available from International Business Machines Corporation, Armonk, N.Y. The target identifier may, for example, have been previously entered by user 104 using a contact list manager 106, where the target identifier identifies an entity, such as a user 108, belonging to a different collaboration system (hereinafter "collaboration system B"), such as Yahoo Messenger™, commercially-available from Yahoo! Inc., Sunnyvale, Calif. Preferably, a subscriptions manager 110 previously requested or otherwise created or attempted to create a subscription for information regarding user 108, such as for presence notifications regarding the current status user 108, where the subscription was associated with the target identifier that identifies user 108. The information regarding user 108 is also preferably received by collaboration system A from collaboration system B via a gateway 112 through which collaboration system A communicates with collaboration system B in accordance with conventional techniques.

If the contact associated with the target identifier has been offline for at least the predefined period of time, a replacement searcher 114 is configured to respond by searching a collaboration system directory 116 to find one or more identifiers (hereinafter "replacement identifiers") that are associated with users of collaboration system A who are other than user 104 and who meet predefined peer criteria with respect to user 104. For example, the predefined peer criteria may require that the other users be in the same organizational unit or department as user 104, such as where this information is found in collaboration system directory 116. Preferably, to qualify as a replacement identifier, an identifier found by replacement searcher 114 is different from (i.e., not identical to) the target identifier and meets predefined similarity criteria with respect to the target identifier. The predefined similarity criteria may be expressed using any known measure of similarity, such as, for example, those that are employed by software that checks the spelling of words in a document and suggests replacement words, or soundex algorithms that suggest replacement words that sound similar to a target word.

Replacement searcher 114 preferably presents any replacement identifiers it finds for selection, such as via a computer display for selection by user 104, whereupon contact list manager 106 adds the selected replacement identifier of user 108 into contact list 102, such as by replacing the target identifier with the selected replacement identifier.

Any of the elements shown in FIG. 1 are preferably implemented by one or more computers, such as a computer 118, by implementing any of the elements shown in FIG. 1 in computer hardware and/or in computer software embodied in a non-transient, computer-readable medium in accordance with conventional techniques.

Figure 2:
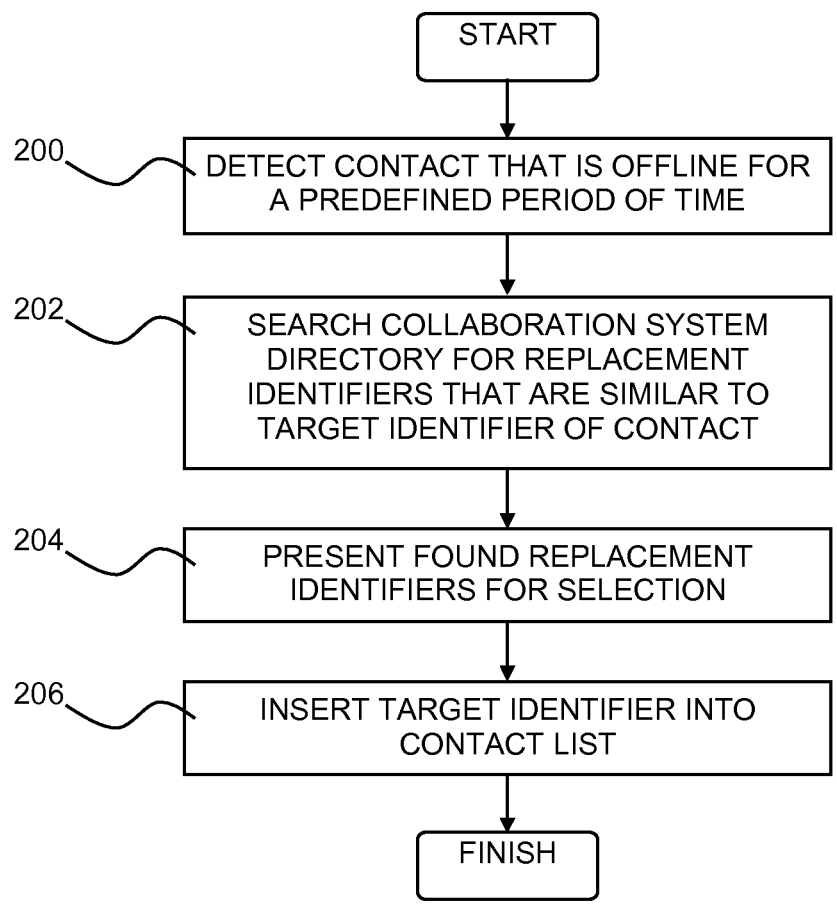
FIG. 2 is a flowchart of a method of operation of the system of FIG. 1, operative in accordance with an embodiment of the invention.

Reference is now made to FIG. 2 which is a flowchart illustration of a method of operation of the system of FIG. 1, operative in accordance with an embodiment of the invention. In the method of FIG. 2, a contact is detected as being offline for at least a predefined period of time, where the contact is identified by a target identifier in a contact list belonging to a first user of a first collaboration system (step 200). A collaboration system directory is searched to find one or more replacement identifiers associated with at least a second user of the collaboration system that meets predefined peer criteria with respect to the first user (step 202), where the replacement identifier is different from the target identifier and meets a predefined similarity criterion with respect to the target identifier. The replacement identifiers found during the search are preferably presented for selection, such as by the first user to whom the contact list belongs (step 204). A selected replacement identifier is added into the contact list, such as by replacing the target identifier (step 206).

Figure 3:
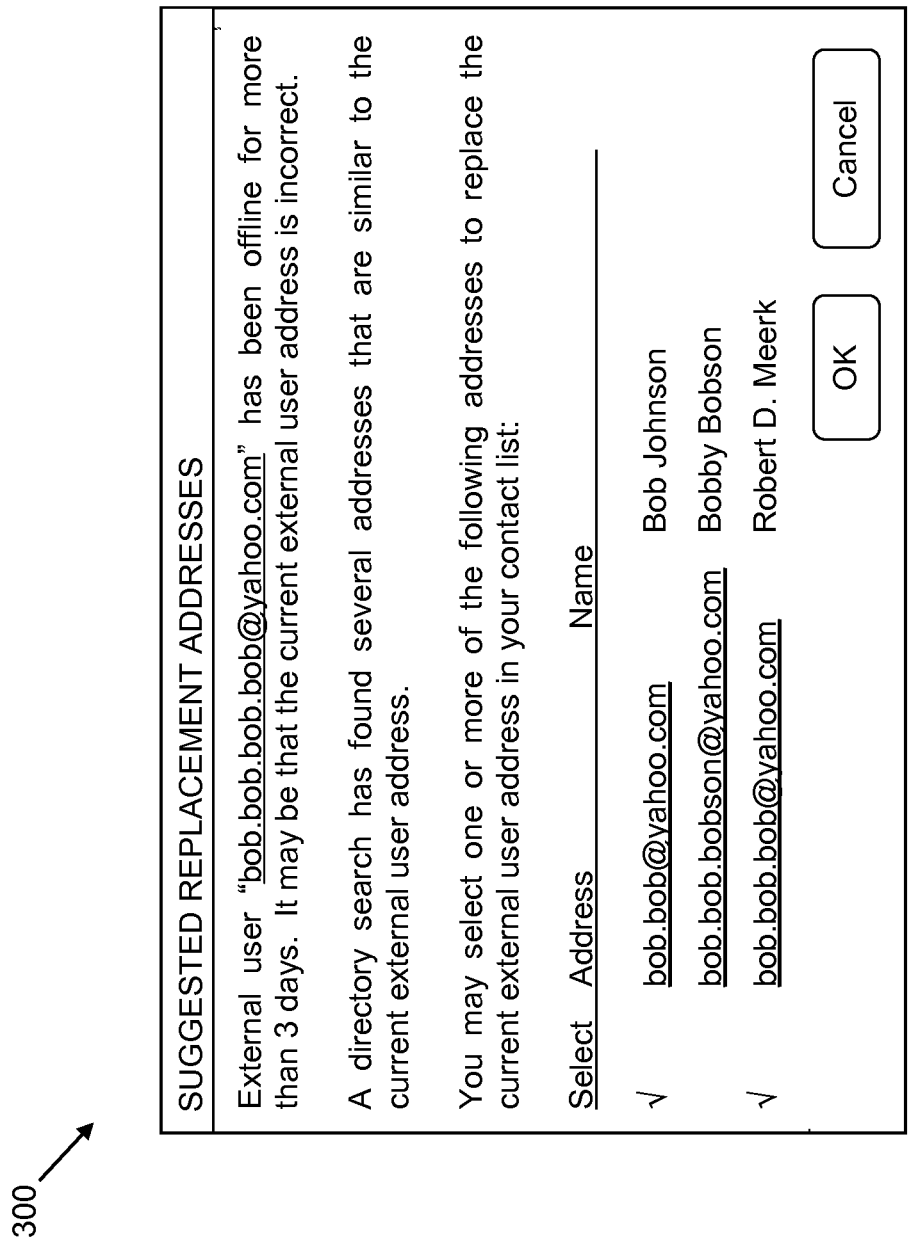
FIG. 3 is an illustration of an operational scenario of the system of FIG. 1 and the method of FIG. 2 in accordance with an embodiment of the invention.

FIG. 3 is an illustration of an operational scenario of the system of FIG. 1 and the method of FIG. 2 in accordance with an embodiment of the invention. In FIG. 3 a window 300 is presented to a user indicating that a contact identified by the email address bob.bob.bob.bob@yahoo.com has been offline for three days, and that the contact identifier may, therefore, be incorrect. Window 300 indicates that a search was conducted for replacement identifiers that are similar to the contact identifier, and that several such email addresses were found. The user is invited to select one or more of the email addresses to replace the current email address for the contact in the user's contact list.

Figure 4:
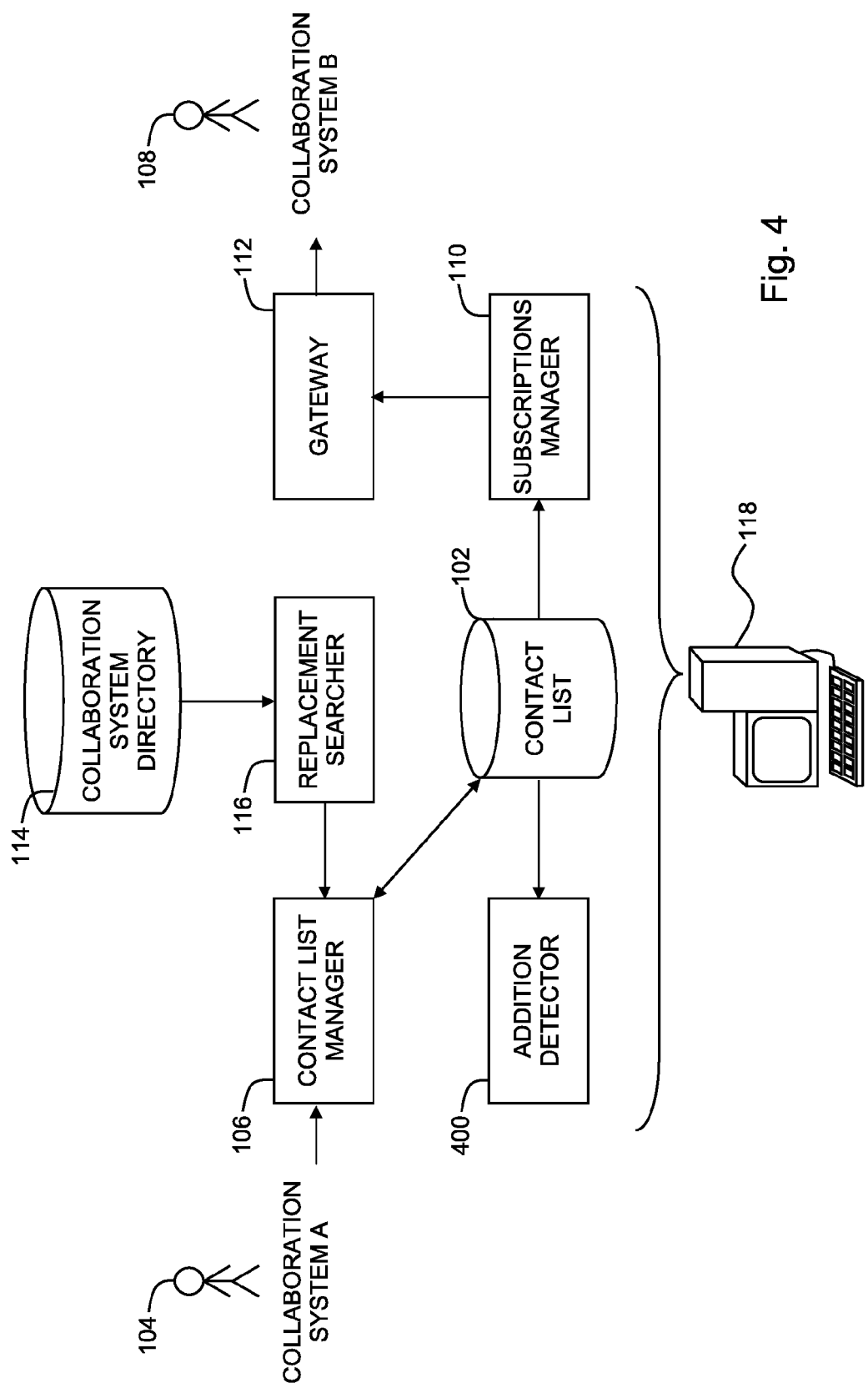
FIG. 4 is an illustration of a system for managing a contact list in a collaboration system, constructed and operative in accordance with an embodiment of the invention.

Reference is now made to FIG. 4 which is an illustration of a system for managing a contact list in a collaboration system, constructed and operative in accordance with an alternative embodiment of the invention. The system of FIG. 4 is substantially similar to the system of FIG. 1, but for the notable exception that in place of offline detector 100 that detects if the contact associated with the target identifier has been offline for at least the predefined period of time, the system of FIG. 4 includes an addition detector 400 that is configured to detect if the target identifier is being entered into contact list 102, such as by user 104 using contact list manager 106, whereupon replacement searcher 114 searches collaboration system directory 116 to find one or more replacement identifiers as described above.

Figure 5:
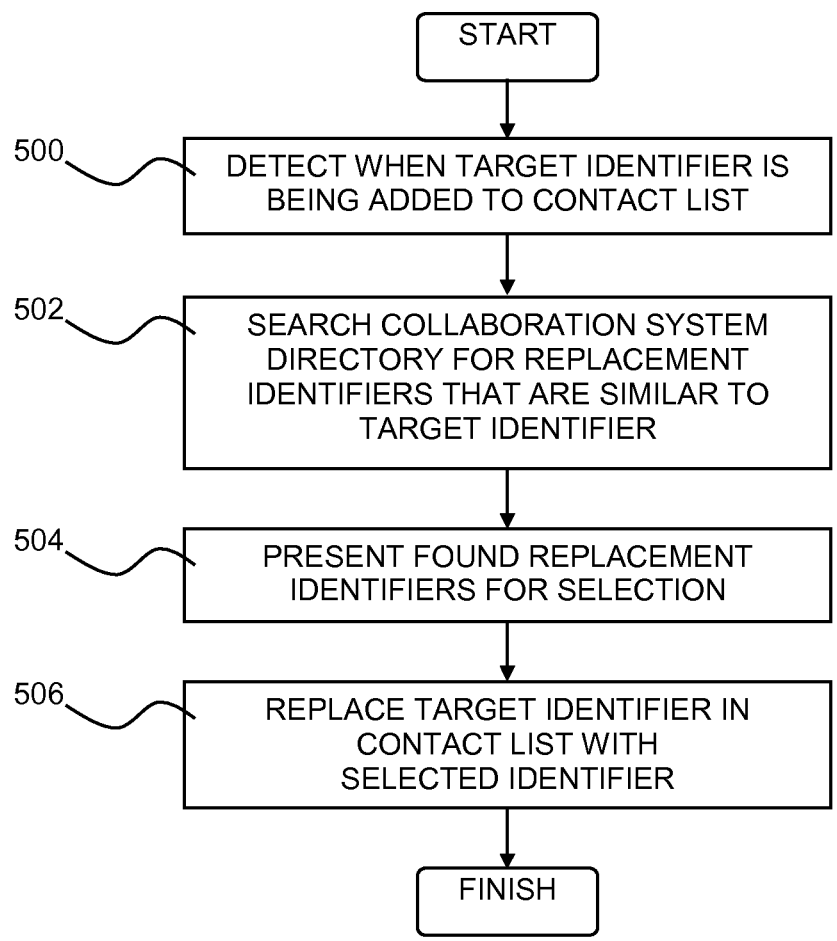
FIG. 5 is a flowchart of a method of operation of the system of FIG. 1, operative in accordance with an embodiment of the invention.

Reference is now made to FIG. 5 which is a flowchart of a method of operation of the system of FIG. 4, operative in accordance with an embodiment of the invention. In the method of FIG. 5, a target identifier identifying a contact is detected if it is being entered into a contact list belonging to a first user of a first collaboration system (step 500). A collaboration system directory is searched to find one or more replacement identifiers associated with at least a second user of the collaboration system that meets predefined peer criteria with respect to the first user (step 502), where the replacement identifier is different from the target identifier and meets a predefined similarity criterion with respect to the target identifier. The replacement identifiers found during the search are preferably presented for selection, such as by the first user to whom the contact list belongs (step 504). A selected replacement identifier is added to the contact list (step 506).

Figure 6:
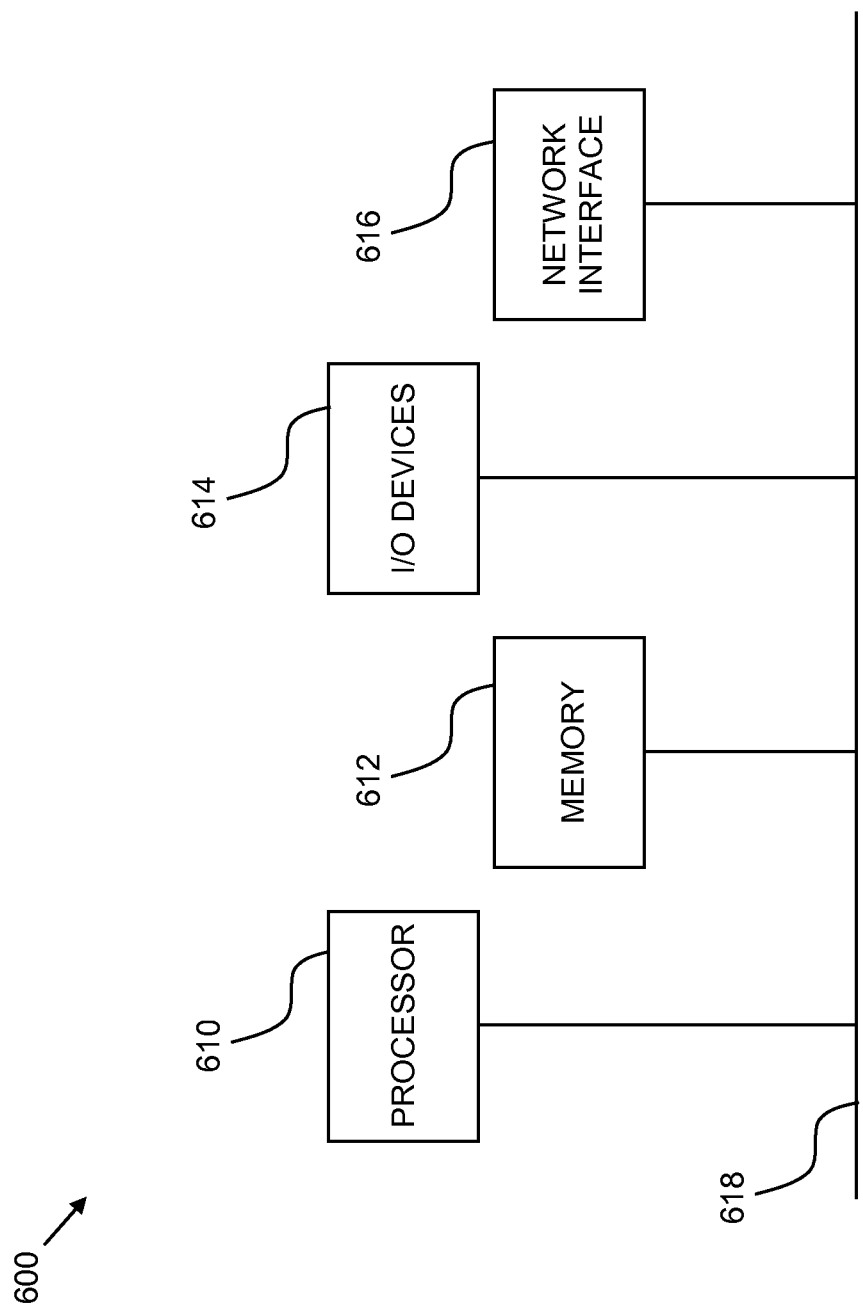
FIG. 6 is a block diagram of a hardware implementation of a computing system, constructed and operative in accordance with an embodiment of the invention.

Referring now to FIG. 6, block diagram 600 illustrates a hardware implementation of a computing system in accordance with which one or more components/methodologies of the invention (e.g., components/methodologies described in the context of FIGS. 1-5) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:
detecting when a contact has been offline for at least a predefined period of time to indicates that a user entered target identifier for the contact is likely incorrect, wherein the contact is identified by the target identifier in a contact list of a first user of a first collaboration system;
searching a collaboration system directory to find a replacement identifier for the target identifier that is likely incorrect wherein the replacement identifier
a) is different from the target identifier, and
b) meets a predefined similarity criterion with respect to the target identifier, wherein said predefined similarity criteria being expressed using a known measure of similarity, said known measure of similarity being assessed based on similarity in spelling of words, similarity in how words sound, or combinations thereof; and
replacing the target identifier of the contact with the replacement identifier in the contact list of the first user so that the target identifier that was likely incorrect is no longer used for the contact, wherein the replacement identifier is not present in the contact list of the first user before the adding, wherein the replacement identifier of the searching is a replacement identifier for the contact in the first collaboration system, wherein the replacement identifier identifies the same contact in a second collaboration system, wherein said second collaboration system is external of the first collaboration system, wherein the searching the first collaboration system restricts searching to other users of the first collaboration system satisfying a peer criteria with the first user, wherein the peer criteria requires the other users to be in a same organization unit or department as the first user, wherein searching the second collaboration system is restricted to a set of other users satisfying conditions of predefined peer criteria with the first user.

2. The method of claim 1, wherein the adding of the replacement identifier in the contact list of the first user results in the contact list of the first user including the target identifier and the replacement identifier.

3. The method of claim 1, wherein the searching comprises searching the replacement identifier sounding similar to the target identifier.

4. The method of claim 1, wherein the replacement identifier is associated with a second user, and wherein the second user meets a predefined peer criterion with respect to the first user.

5. The method of claim 1 and further comprising:
presenting, via a computer-controlled output device, the replacement identifier in a manner that shows that the replacement identifier is a candidate for replacing the target identifier; and
receiving, responsive to presenting the replacement identifier, an instruction for adding the replacement identifier into the contact list of the first user.

6. A method comprising:
detecting when a target identifier is being entered into a contact list of a first user of a first collaboration system, wherein the target identifier is not present in the contact list before being entered into the contact list;
searching, responsive to detecting when the target identifier is being entered into the contact list, a collaboration system directory to find a replacement identifier wherein the replacement identifier
a) is different from the target identifier, and
b) meets a predefined similarity criterion with respect to the target identifier, wherein said predefined similarity criteria being expressed using a known measure of similarity, said known measure of similarity being assessed based on similarity in spelling of words, similarity in how words sound, or combinations thereof; and
adding the replacement identifier into the contact list of the first user, wherein the replacement identifier is not present in the contact list of the first user before the adding, and wherein the target identifier and the replacement identifier identify the same contact, wherein the replacement identifier of the searching is a replacement identifier for the contact in the first collaboration system, wherein the replacement identifier identifies the same contact in a second collaboration system, wherein said second collaboration system is external of the first collaboration system, wherein the searching the first collaboration system restricts searching to other users of the first collaboration system satisfying a peer criteria with the first user, wherein the peer criteria requires the other users to be in a same organization unit or department as the first user, wherein searching the second collaboration system is restricted to a set of other users satisfying conditions of predefined peer criteria with the first user.

7. The method of claim 6, wherein the adding of the replacement identifier into the contact list, replaces the target identifier with the replacement identifier in the contact list of the first user so that after the replacement, the target identifier is no longer in the contact list of the first user.

8. The method of claim 6, wherein the searching comprises searching the replacement identifier sounding similar to the target identifier.

9. A system comprising:
one or more processors;
one or more non-transitory storage mediums storing program instructions able to be executed by at least one of the one or more processors;
an offline detector, comprising a subset of the program instructions, configured to detect when a contact has been offline for at least a predefined period of time, wherein the contact is identified by a target identifier in a contact list of a first user of a first collaboration system;
a replacement searcher, comprising a subset of the program instructions, configured to search a collaboration system directory to find a replacement identifier wherein the replacement identifier
a) is different from a target identifier, and
b) meets a predefined similarity criterion with respect to the target identifier, wherein said predefined similarity criteria being expressed using a known measure of similarity, said known measure of similarity being assessed based on similarity in spelling of words, similarity in how words sound, or combinations thereof; and
a contact list manager, comprising a subset of the program instructions, configured to add the replacement identifier into the contact list of the first user, wherein the replacement identifier is not present in the contact list of the first user before the adding, and wherein the target identifier and the replacement identifier identify the same contact, wherein the replacement identifier of the replacement searcher is a replacement identifier for the contact in the first collaboration system, wherein the replacement identifier identifies the same contact in a second collaboration system, wherein said second collaboration system is external of the first collaboration system, wherein the replacement searcher searches the first collaboration system restricts searching to other users of the first collaboration system satisfying a peer criteria with the first user, wherein the peer criteria requires the other users to be in a same organization unit or department as the first user, wherein replacement searcher searches the second collaboration system is restricted to a set of other users satisfying conditions of predefined peer criteria with the first user.

10. The system of claim 9, wherein the adding of the replacement identifier into the contact list, replaces the target identifier with the replacement identifier in the contact list of the first user so that after the replacement, the target identifier is no longer in the contact list of the first user.

11. The system of claim 9, wherein the replacement searcher is configured to search the replacement identifier sounding similar to the target identifier.

12. The system of claim 9 wherein the replacement searcher is configured to present, via a computer-controlled output device, the replacement identifier in a manner that shows that the replacement identifier is a candidate for replacing the target identifier, and
receive, responsive to presenting the replacement identifier, an instruction for adding the replacement identifier into the contact list of the first user.

13. A system comprising:
one or more processors;
one or more non-transitory storage mediums storing program instructions able to be executed by at least one of the one or more processors;
an addition detector, comprising a subset of the program instructions, configured to detect when a target identifier is being entered into a contact list of a first user of a first collaboration system, wherein the target identifier is not present in the contact list before being entered into the contact list;
a replacement searcher, comprising a subset of the program instructions, configured to search a collaboration system directory to find, responsive to detecting when the target identifier is being entered into the contact list, a replacement identifier associated with a second user of the first collaboration system,
wherein the second user meets a predefined peer criterion with respect to the first user, and
wherein the replacement identifier
  a) is different from a target identifier, and
  b) meets a predefined similarity criterion with respect to the target identifier, wherein said predefined similarity criteria being expressed using a known measure of similarity, said known measure of similarity being assessed based on similarity in spelling of words, similarity in how words sound, or combinations thereof; and
a contact list manager, comprising a subset of the program instructions, configured to add the replacement identifier into the contact list of the first user, wherein the replacement identifier of the replacement searcher is a replacement identifier for the contact in the first collaboration system, wherein the replacement identifier identifies the same contact in a second collaboration system, wherein said second collaboration system is external of the first collaboration system, wherein the replacement searcher searches the first collaboration system restricts searching to other users of the first collaboration system satisfying a peer criteria with the first user, wherein the peer criteria requires the other users to be in a same organization unit or department as the first user, wherein replacement searcher searches the second collaboration system is restricted to a set of other users satisfying conditions of predefined peer criteria with the first user.

14. The system of claim 13, wherein the contact list manager is configured to add the replacement identifier into the contact list by replacing the target identifier with the replacement identifier in the contact list of the first user.

15. The system of claim 13, wherein the replacement searcher is configured to search the replacement identifier sounding similar to the target identifier.

16. A computer program product comprising:
a non-transitory computer-readable storage medium; and
computer-readable program code embodied in the non-transitory computer-readable storage medium, wherein the computer-readable program code comprises a set of instructions able to be executed by a processor, wherein said computer-readable program code is configured, for a contact that is identified by a target identifier in a contact list of a first user of a first collaboration system, to
search a collaboration system directory to find a replacement identifier, wherein the replacement identifier
  a) is different from a target identifier, and
  b) meets a predefined similarity criterion with respect to the target identifier, wherein said predefined similarity criteria being expressed using a known measure of similarity, said known measure of similarity being assessed based on similarity in spelling of words, similarity in how words sound, or combinations thereof; and
computer-readable program code embodied in the computer-readable storage medium, wherein the computer-readable program code comprises a set of instructions able to be executed by a processor, wherein said computer-readable program code is configured to add the replacement identifier into the contact list of the first user, wherein the replacement identifier of the code configured to search is a replacement identifier for the contact in the first collaboration system, wherein the replacement identifier identifies the same contact in a second collaboration system, wherein said second collaboration system is external of the first collaboration system, wherein the code configured to search the first collaboration system restricts searching to other users of the first collaboration system satisfying a peer criteria with the first user, wherein the peer criteria requires the other users to be in a same organization unit or department as the first user, wherein code configured to search the second collaboration system is restricted to a set of other users satisfying conditions of predefined peer criteria with the first user.

17. The computer program product of claim 16 wherein the computer-readable program code is configured to add the replacement identifier into the contact list by replacing the target identifier with the replacement identifier in the contact list of the first user.

18. The computer program product of claim 16 wherein the computer-readable program code is configured to detect when the contact has been offline for at least a predefined period of time.

19. The computer program product of claim 18 wherein the computer-readable program code is configured to search the replacement identifier sounding similar to the target identifier.

* * * * *